(12) United States Patent
Imai

(10) Patent No.: US 7,876,682 B2
(45) Date of Patent: Jan. 25, 2011

(54) ADMISSION CONTROL METHOD AND ADMISSION CONTROL SYSTEM

(75) Inventor: Satoshi Imai, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 311 days.

(21) Appl. No.: 12/034,315

(22) Filed: Feb. 20, 2008

(65) Prior Publication Data

US 2008/0205268 A1    Aug. 28, 2008

(30) Foreign Application Priority Data

Feb. 23, 2007    (JP) ............................. 2007-044544

(51) Int. Cl.
H04L 12/26       (2006.01)
(52) U.S. Cl. .................. 370/232; 370/231; 370/252
(58) Field of Classification Search ......... 370/230–235, 370/252, 253
See application file for complete search history.

(56) References Cited

U.S. PATENT DOCUMENTS

| | | | |
|---|---|---|---|
| 6,839,767 B1* | 1/2005 | Davies et al. | 709/232 |
| 2004/0165528 A1* | 8/2004 | Li et al. | 370/230 |
| 2008/0080374 A1* | 4/2008 | Nuzman et al. | 370/230 |

FOREIGN PATENT DOCUMENTS

| | | |
|---|---|---|
| JP | 54-162917 | 12/1979 |
| JP | 2002-152204 | 5/2002 |
| JP | 2005236495 | 9/2005 |
| JP | 2006020110 | 1/2006 |

OTHER PUBLICATIONS

Japanese Office Action dated Jun. 16, 2009, from the corresponding Japanese Application.
Satoshi Imai, et al. "Rate Control in Communication Networks for Changes of the Number of Connections" Journal of The Institute Systems, Control and Information Engineers, vol. 17, No. 1, pp. 10-16, 2004.

* cited by examiner

Primary Examiner—Ricky Ngo
Assistant Examiner—Wei-Po Kao
(74) Attorney, Agent, or Firm—Fujitsu Patent Center

(57) ABSTRACT

An admission control method for determining a session admission probability with respect to a new session admission of a path, so that a bandwidth measured in the path and corresponding to a sum of bandwidth used converges to a vicinity of a specified target value, includes computing the session admission probability based on a deviation between the measured bandwidth and the bandwidth target value using a feedback control rule, and judging whether or not to accept a new session in the path based on the computed session admission probability, and processing the new session admission based on a result of the judging.

9 Claims, 19 Drawing Sheets

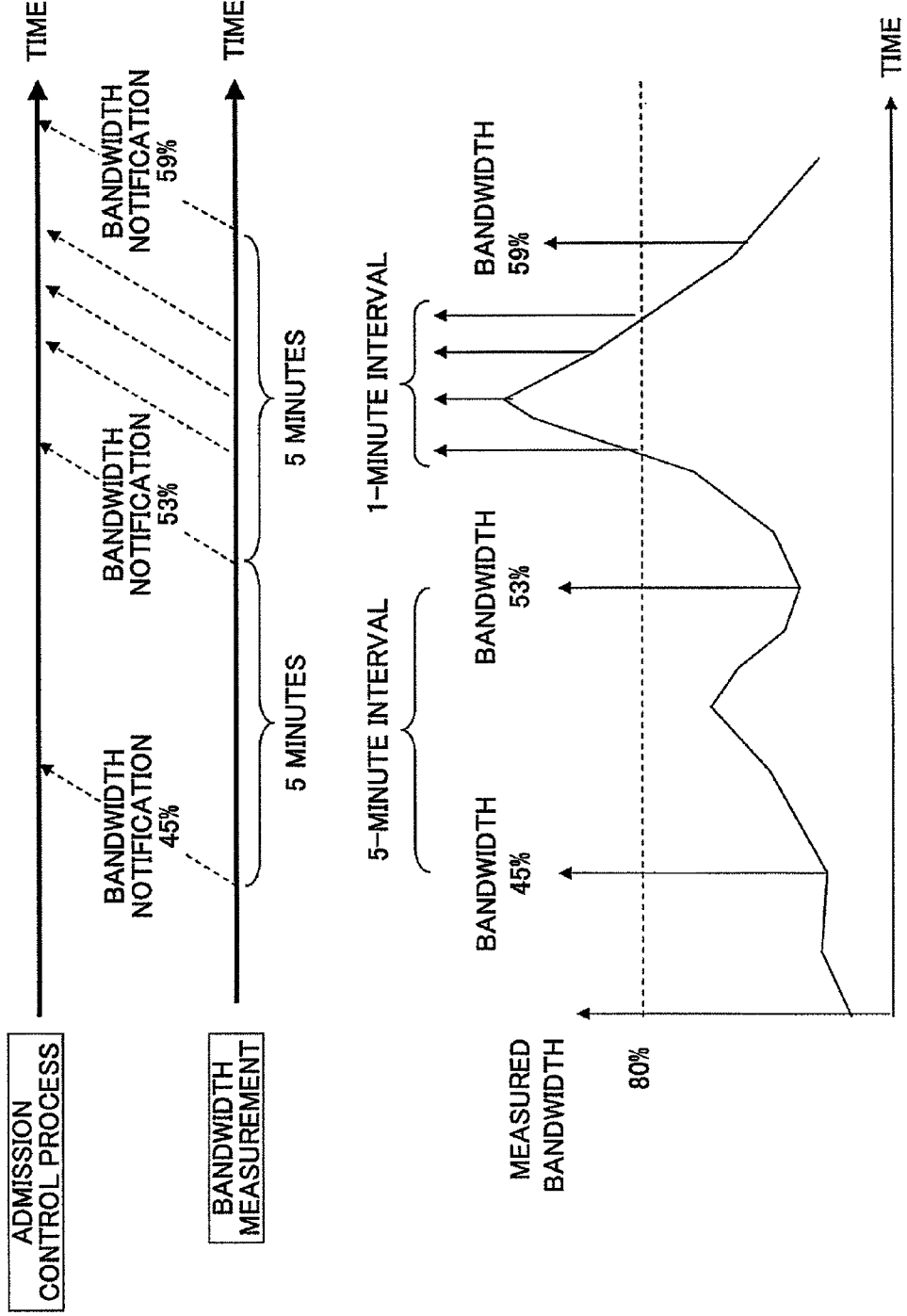

ADMISSION CONTROL METHOD AND ADMISSION CONTROL SYSTEM

BACKGROUND OF THE INVENTION

1. Field of the Invention

The present invention generally relates to admission control methods and admission control systems, and more particularly to an admission control method and an admission control system which carry out a session admission control based on a bandwidth measurement.

2. Description of the Related Art

As conventional session admission control methods, there are the bandwidth summation type admission control method and the bandwidth measurement type admission control method.

The bandwidth summation type admission control method summates the bandwidth which will be used and is declared when starting each session, and judges whether or not to accept the session depending on whether or not the summation of the bandwidth exceeds a preset bandwidth threshold value.

The bandwidth measurement type admission control method judges whether or not to accept the session depending on whether or not a sum of the bandwidth measured by a measuring apparatus exceeds a bandwidth threshold value.

The applicant is aware of Japanese Laid-Open Patent Applications No. 2005-236495 and No. 2006-020110.

The Japanese Laid-Open Patent Application No. 2005-236495 proposes a system which includes a bandwidth prediction means and predicts a data communication bandwidth at a time other than a measuring time, from start information and end information related to the data communication. The start or rejection of the data communication is determined based on the predicted bandwidth and the amount of bandwidth used by the network.

On the other hand, the Japanese Laid-Open Patent Application No. 2006-020110 proposes a method in which, between a user terminal and a service providing server, a transmitting end continuously transmits probe packets via the network, a receiving end utilizes a delay characteristic of the probe packets that are continuously received to compute an end-to-end usable bandwidth in a network path between the user terminal and the service providing server, and an admission control server receives a service request from the user terminal and judges whether or not to accept the service request by comparing the computation result of the end-to-end usable bandwidth and the bandwidth required by the requested service.

The bandwidth summation type admission control method manages the bandwidth which will be used and is declared when starting each session. Although the bandwidth can be closely controlled, managing the bandwidth which will be used and are declared by all sessions makes the bandwidth summation type admission control unsuitable for application to a large-scaled network and lack scalability. In addition, there is a problem in that it is difficult to know the actual bandwidth which will be used by each of the individual sessions.

There is also a method which requires a peak value (declared peak bandwidth) of each session to be declared, and summates the peak declaration bandwidth. However, even if the sum of the peak declaration bandwidth is actually not used, the admission for a new session will be rejected when the sum of the declared peak bandwidth exceeds the preset threshold value, and there is a problem in that the utilization efficiency of the network deteriorates.

The bandwidth measurement type admission control method manages only the sum of the bandwidth, and has a good scalability. However, if the traffic is concentrated during notification intervals of the bandwidth information to the admission control server, it is impossible to cope with an overshoot of the sum of the bandwidth exceeding the preset bandwidth threshold value or the bandwidth exceeding the physical bandwidth due the traffic concentration, and there is a problem in that the communication quality deteriorates.

SUMMARY OF THE INVENTION

Accordingly, it is a general object of the present invention to provide a novel and useful admission control method and admission control system, in which the problems described above are suppressed.

Another and more specific object of the present invention is to provide an admission control method and an admission control system, which can suppress an overshoot of the bandwidth in a measuring path and make the sum of the bandwidth converge to a vicinity of a specified target value.

According to one aspect of the present invention, an admission control method for determining a session admission probability with respect to a new session request, so that a bandwidth measured in the path converges to a vicinity of a specified target value, includes computing the session admission probability based on a deviation between the measured bandwidth and the bandwidth target value using a feedback control rule, and judging whether or not to accept a new session in the path based on the computed session admission probability, and processing the new session admission based on a result of the judging.

According to another aspect of the present invention, an admission control system for determining a session admission probability with respect to a new session request, so that a bandwidth measured in the path converges to a vicinity of a specified target value, comprises a bandwidth measuring apparatus configured to measure the sum of the bandwidth used in the path as a measured bandwidth, an admission control server configured to compute the session admission probability based on a deviation between the measured bandwidth notified from the bandwidth measuring apparatus and the bandwidth target value using a feedback control rule, and a session management server configured to judge whether or not to accept a new session in the path based on the session admission probability computed by the admission control server, and to process the new session admission based on a result of the judge. According to this aspect of the present invention, it is possible to suppress an overshoot of the bandwidth in the measuring path and make the sum of the bandwidth converge to a vicinity of the specified target value, and thus, the traffic usage can be improved without deteriorating the communication quality of each session. According to this aspect of the present invention, it is possible to suppress an overshoot of the bandwidth in the measuring path and make the sum of the bandwidth converge to a vicinity of the specified target value, and thus, the traffic usage can be improved without deteriorating the communication quality of each session.

Other objects and further features of the present invention will be apparent from the following detailed description when read in conjunction with the accompanying drawings.

BRIEF DESCRIPTION OF THE DRAWINGS

FIG. 19 is a diagram showing states of a bandwidth notification when the measured bandwidth which was less than a dangerous bandwidth threshold value exceeds the dangerous bandwidth threshold value.

DESCRIPTION OF THE PREFERRED EMBODIMENTS

Figure 1:
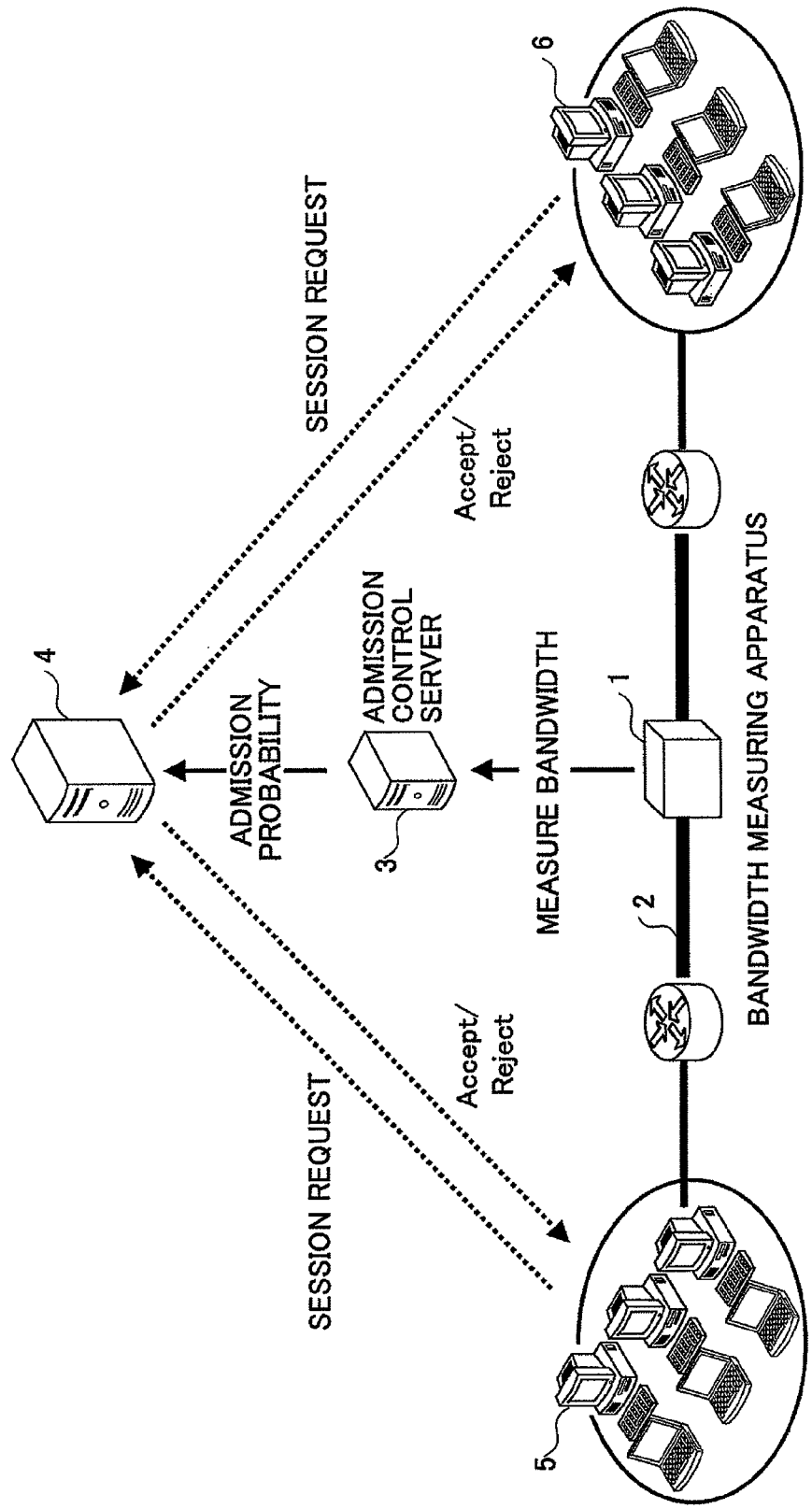
FIG. 1 is a diagram showing a system structure of an embodiment of an admission control system according to the present invention.

A description will be given of embodiments of the present invention, by referring to the drawings.

[Structure of Admission Control System]

FIG. 1 is a diagram showing a system structure of an embodiment of an admission control system according to the present invention. In FIG. 1, a bandwidth measuring apparatus 1 measures the sum (or total amount) of bandwidth used in a measuring path 2, and notifies the measured bandwidth information to an admission control server 3.

The admission control server 3 obtains a session admission probability from the acquired bandwidth information according to a feedback control rule, and notifies the session admission probability to a session management server 4. For example, the session management server 4 is a session initiation protocol (SIP) server.

The session management server 4 judges whether or not to accept a session request based on the session admission probability set from the admission control server 3, every time a new session request using the measuring path 2 is received from user terminals 5, 6 and the like. The session management server 4 also sends a result of the judgment, as a response, to the user terminal which made the session request.

Figure 2:
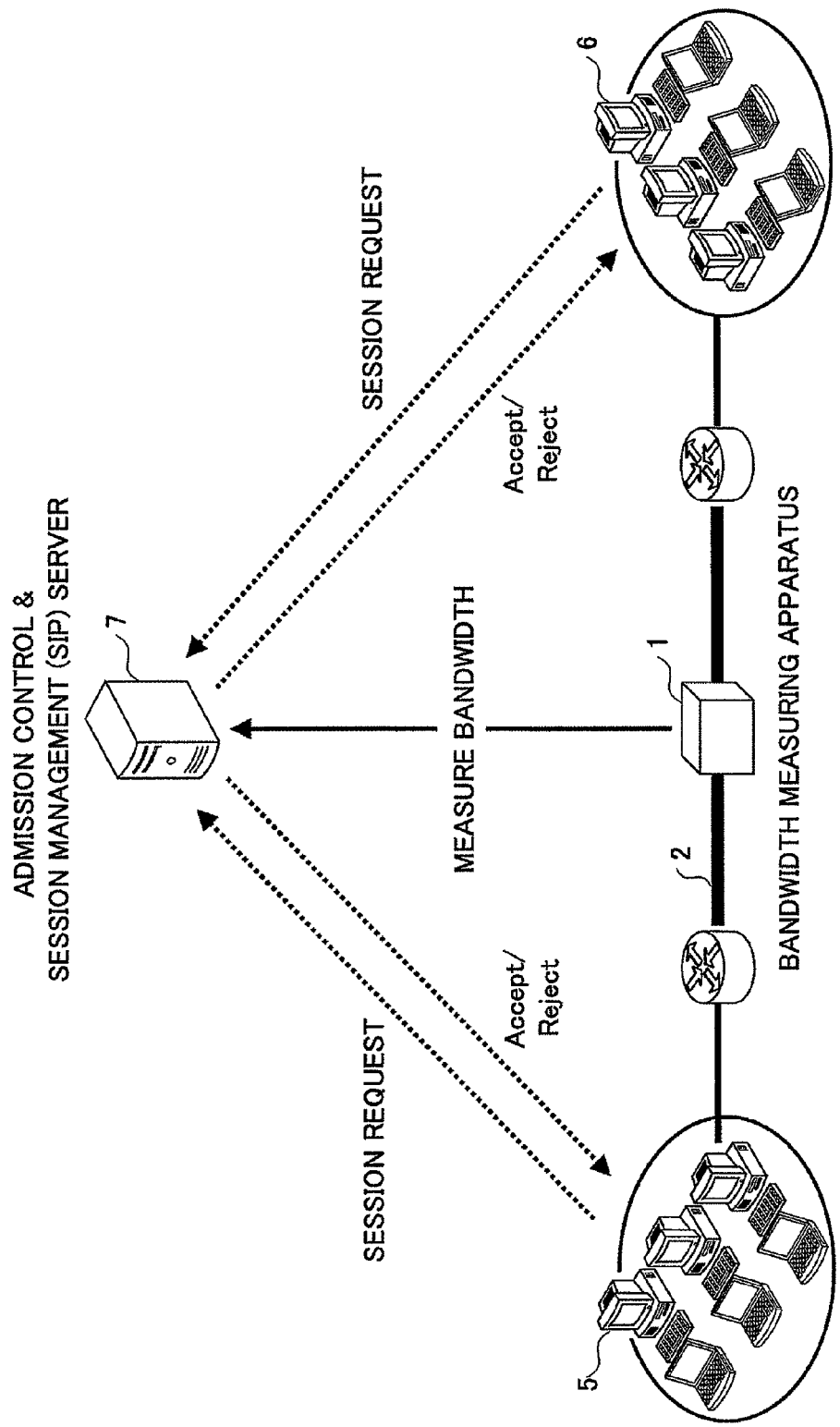
FIG. 2 is a diagram showing a system structure of another embodiment of the admission control system according to the present invention.

The session management server 4 may be formed by an existing session management server. In addition, instead of providing the admission control server 3 and the session management server 4, it is possible to provide an admission control and session management server 7 shown in FIG. 2, which has the functions of both the admission control server 3 and the session management server 4. FIG. 2 is a diagram showing a system structure of another embodiment of the admission control system according to the present invention.

[Operating Principle of Admission Control System]

Figure 3:
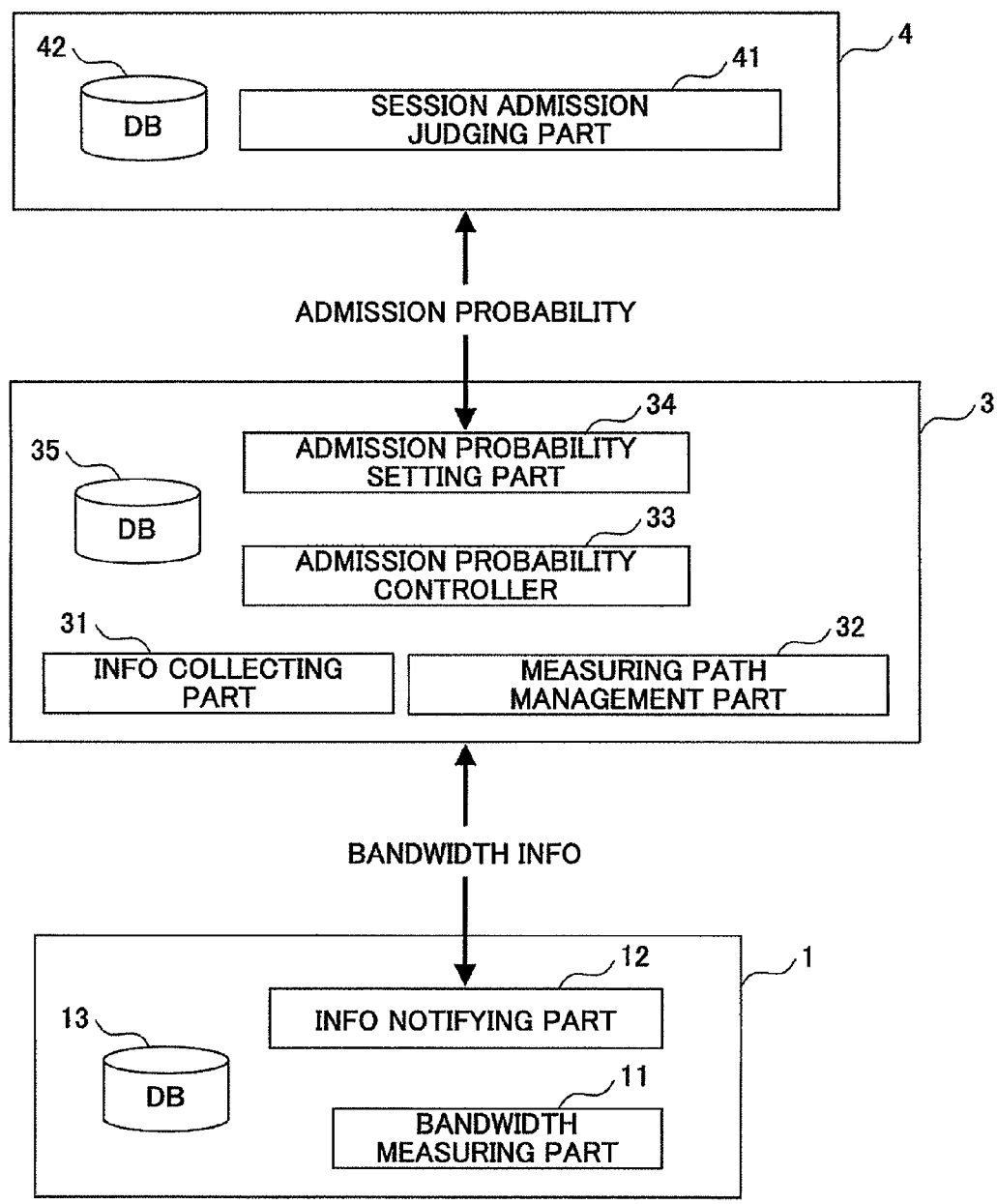
FIG. 3 is a diagram for explaining an operating principle of the admission control system shown in FIG. 1.

FIG. 3 is a diagram for explaining an operating principle of the admission control system shown in FIG. 1. In FIG. 3, a bandwidth measuring part 11 within the bandwidth measuring apparatus 1 measures the sum of the bandwidth in the measuring path 2. An information notifying part 12 manages a notification timing of the measured bandwidth and the like, and notifies the bandwidth information measured by the bandwidth measuring part 11 to the admission control server 3. A database 13 stores the measured bandwidth information and the like.

An information collecting part 31 within the admission control server 3 collects the bandwidth information notified from the bandwidth measuring apparatus 1. A measuring path management part 32 manages location (or path) information set in the bandwidth measuring apparatus 1, and identifies session information passing through the location (or path).

An admission probability controller 33 computes a session admission probability from the acquired bandwidth information according to the feedback control rule. An admission probability setting part 34 sets the session admission probability which is computed by the admission probability controller 33 to a session admission judging part 41 within the session management server 4. A database 35 stores the acquired bandwidth information, the computed session admission probability and the like.

The session admission judging part 41 within the session management server 4 judges whether or not to accept a session request based on the set session admission probability, every time a new session request using the measuring path 2 is received from user terminals 5, 6 and the like. The session management server 4 also sends the result of the judgment, as a response, to the user terminal which made the session request. A database 42 stores the session being executed by each user terminal, the session admission probability and the like.

[Basic Process]

Figure 4:
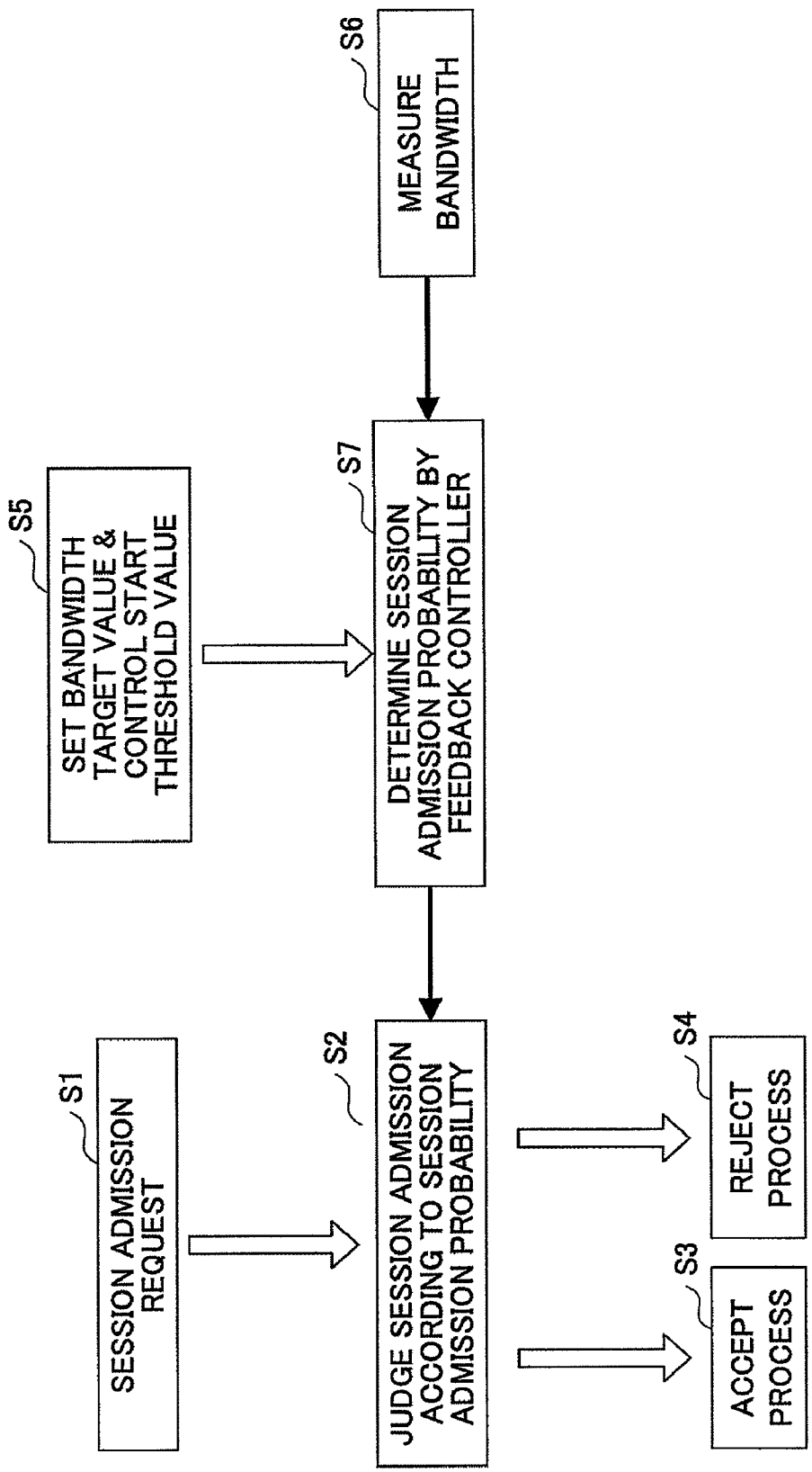
FIG. 4 is a flow chart for explaining a basic process of the admission control system.

FIG. 4 is a flow chart for explaining a basic process of the admission control system.

Step S1: The session management server 4 accepts the new session request from the user terminals 5, 6 and the like.

Step S2: The session management server 4 judges whether or not to accept the new session request, according to the set session admission probability. A new session is accepted in a step S3 if it is judged that the new session request is to be accepted. On the other hand, if it is judged that the new session request is not to be accepted, the admission of the new session is rejected in a step S4.

Step S5: The admission control server 3 is set with a bandwidth target value and a bandwidth threshold value of an admission control start, by an operator. The bandwidth target value is the target value to which the session admission probability is to be converged. The bandwidth threshold value of the admission control start is a reference value that is used to accept all sessions without carrying out an admission control when the measured bandwidth is less than or equal to the bandwidth threshold value, and to carry out the admission control when the measured bandwidth exceeds the bandwidth threshold value. By setting the admission control start timing by the bandwidth threshold value of the admission control start, it is possible to prevent generating rejection of the admission probability-wise, in a state where the bandwidth usage is low.

Step S6: The admission control server 3 collects the bandwidth information that is measured by and notified from the bandwidth measuring apparatus 1.

Step S7: The admission control server 3 determines the session admission probability by a feedback control so that the measured bandwidth acquired from the bandwidth measuring apparatus 1 converges to the bandwidth target value, and notifies the determined session admission probability to the session management server 4.

[Determination of Session Admission Probability]

Figure 5:
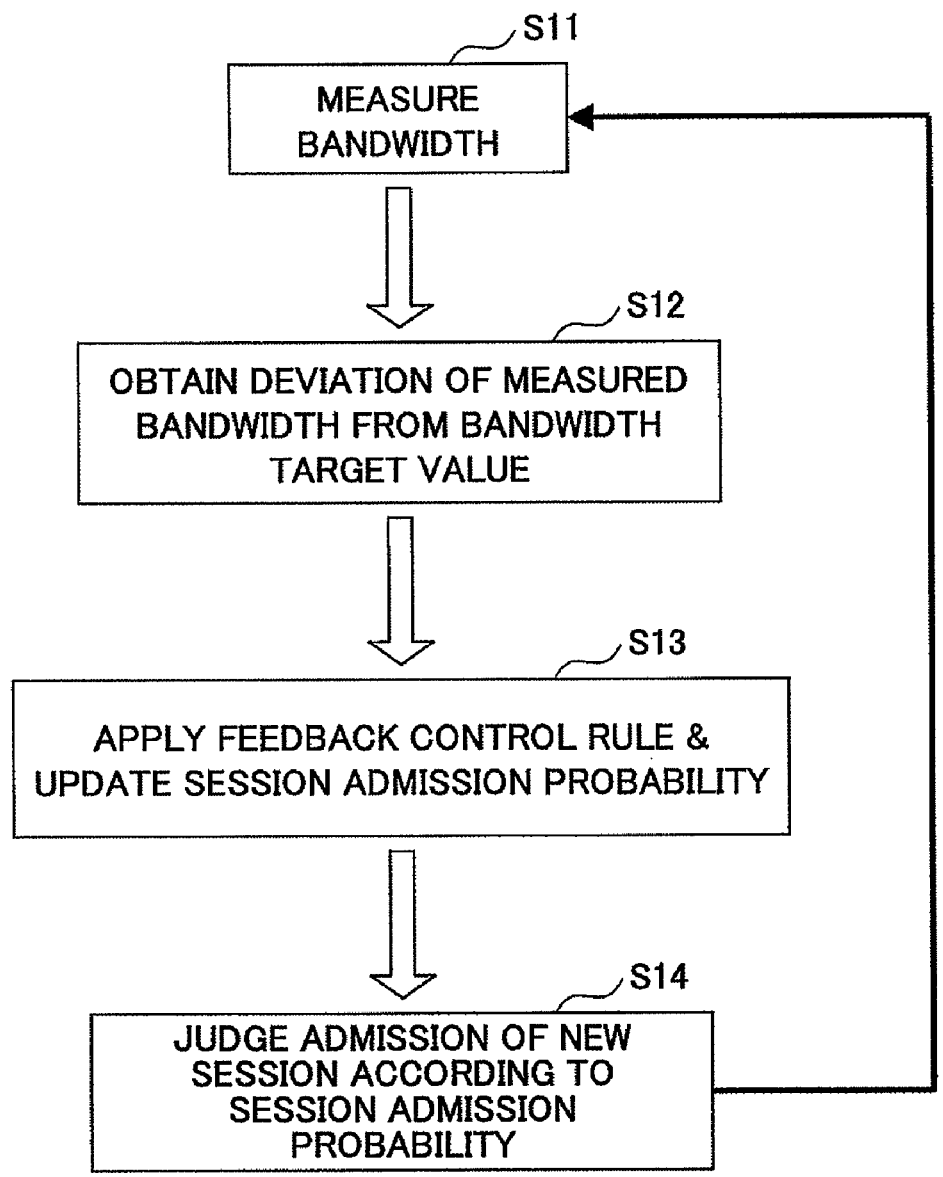
FIG. 5 is a flow chart for explaining a process of determining a session admission probability.
Figure 6:
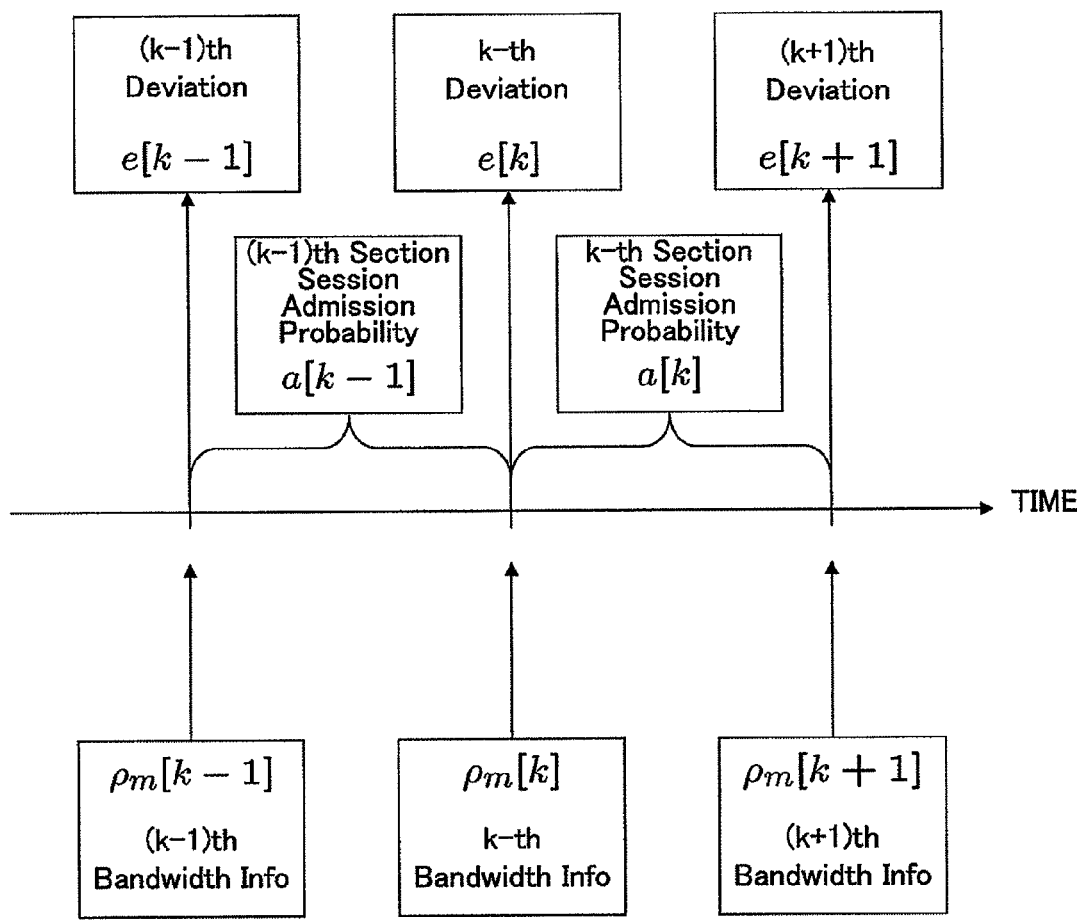
FIG. 6 is a diagram for explaining the determination of the session admission probability.

FIG. 5 is a flow chart for explaining a process of determining the session admission probability, and FIG. 6 is a diagram for explaining the determination of the session admission probability.

Step S11: The admission control server 3 acquires bandwidth information $\rho m[k]$ of a k-th measured bandwidth from the bandwidth measuring apparatus 1.

Step S12: The admission control server 3 obtains a deviation $e[k]$ ($=L_T-\rho m[k]$) of the measured bandwidth $\rho m[k]$ from a bandwidth target value $L_T$.

Step S13: The admission control server 3 computes and updates, by a feedback control, a session admission probability $a[k]$ of a k-th section up to the next measurement shown in FIG. 6.

The following formula (1) is used in the case of the PI feedback control, where a constant P denotes a proportional gain parameter and a constant I denotes an integration gain parameter.

$$a[k]=a[k-1]+P(e[k]-e[k-1])+I\cdot e[k] \quad (1)$$

On the other hand, the following formula (2) is used in the case of the PID feedback control, where a constant D denotes a derivative gain parameter.

$$a[k]=a[k-1]+P(e[k]-e[k-1])+I\cdot e[k]+D\{(e[k]-e[k-1])+(e[k-1]-e[k-2])\} \quad (2)$$

Step S14: The session management server 4 judges whether or not to accept the new session request according to the session admission probability $a[k]$, and the process advances to the step S11.

[Design of Stability Parameter]

Figure 7:
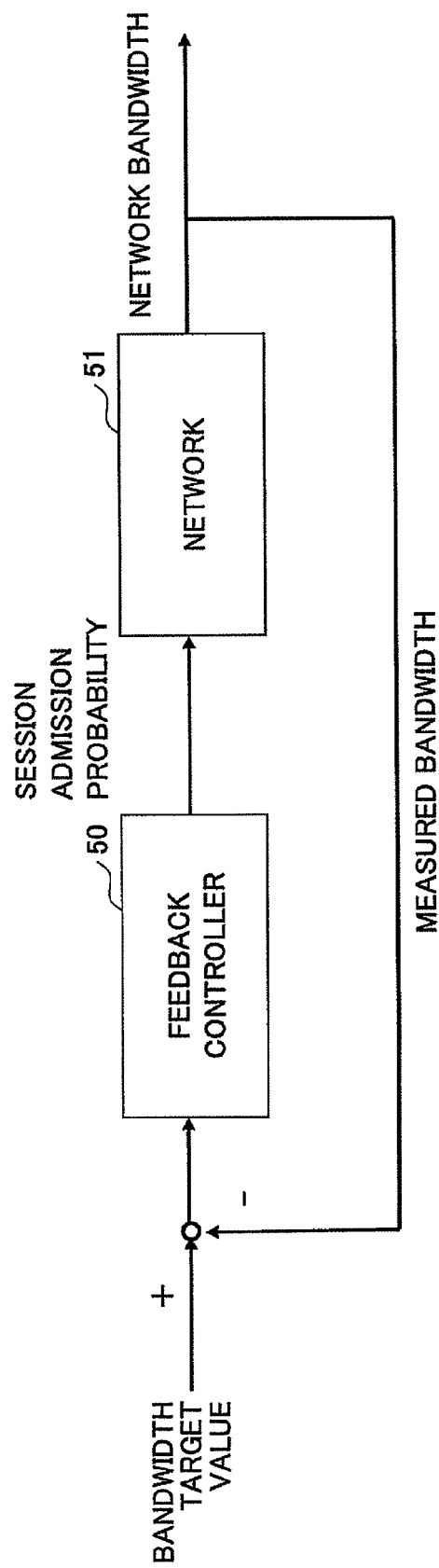
FIG. 7 is a block diagram showing a feedback model with respect to processes of a bandwidth measuring apparatus and an admission control server.

FIG. 7 is a block diagram showing a feedback model with respect to processes of the bandwidth measuring apparatus 1 and the admission control server 3. This feedback model shown in FIG. 7 is formed by a feedback controller 50 and a network 51 including the measuring path 2. If the bandwidth of a session i input in the k-th section is denoted by $in_i$, and the bandwidth of a session j output in the k-th section is denoted by $out_j$, a model representing a change in a sum $\rho$ of the bandwidth of the network 51 when the admission control is carried out for the session admission probability $a[k]$ can be represented by the following formula (3).

$$\rho[k+1]=\rho[k]+a[k]\Sigma_i in_i-\Sigma_j out_j \quad (3)$$

The first term on the right-hand side indicates the k-th sum of the bandwidth, the second term of the right-hand side indicates a product of the k-th session admission probability and the sum of the bandwidth of i sessions requested in the k-th section, and the third term of the right-hand side indicates the sum of the bandwidth of j sessions released in the k-th section.

[PI Controller]

Figure 8:
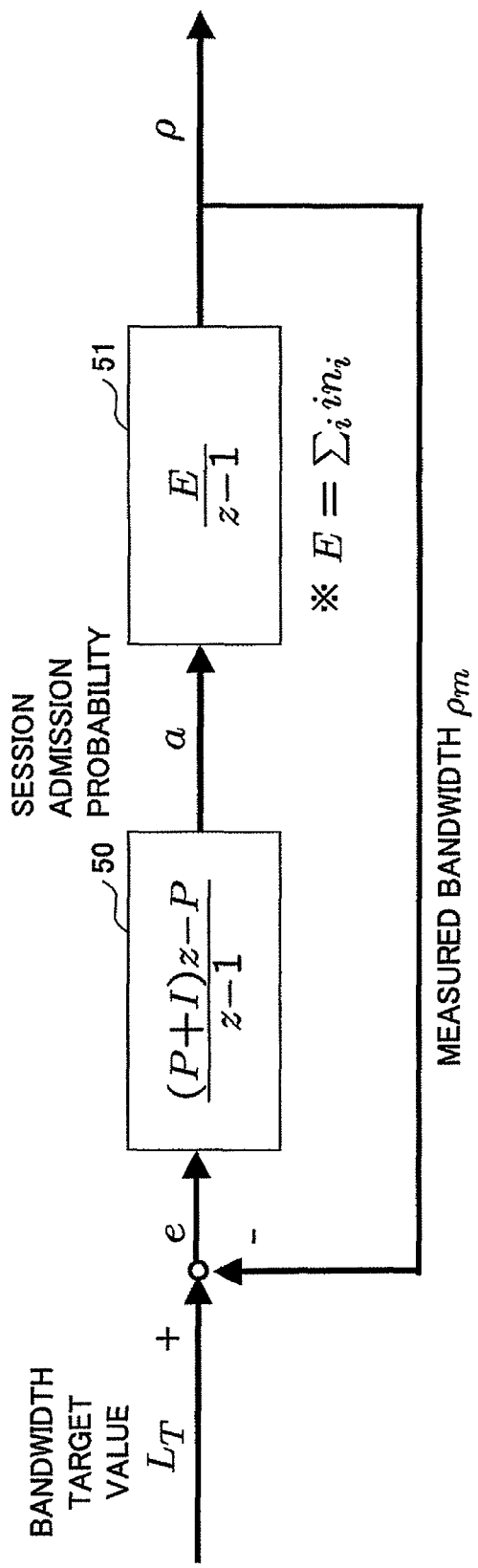
FIG. 8 is a block diagram showing a feedback model for a case where a PI controller is used as a feedback controller.

FIG. 8 is a block diagram showing a feedback model for a case where a PI controller is used as the feedback controller 50. In this case, a closed loop transfer function $G(z)$ of the feedback model can be represented by the following formula (4), where z denotes a z-transform operator, and $E=\Sigma_i in_i$ (sum of the bandwidth of i sessions input in the k-th section).

$$G(z)=[E(P+I)z-EP]/[z^2+\{E(P+I)-2\}z+\{1-EP\}] \quad (4)$$

Control parameters P and I which stabilize the closed loop system may be obtained by Jury's stabilization judging method, and may be represented by the following relationships (5) and (6).

$$0<P<2/E \quad (5)$$

$$0<I<-2P+4/E \quad (6)$$

Figure 9:
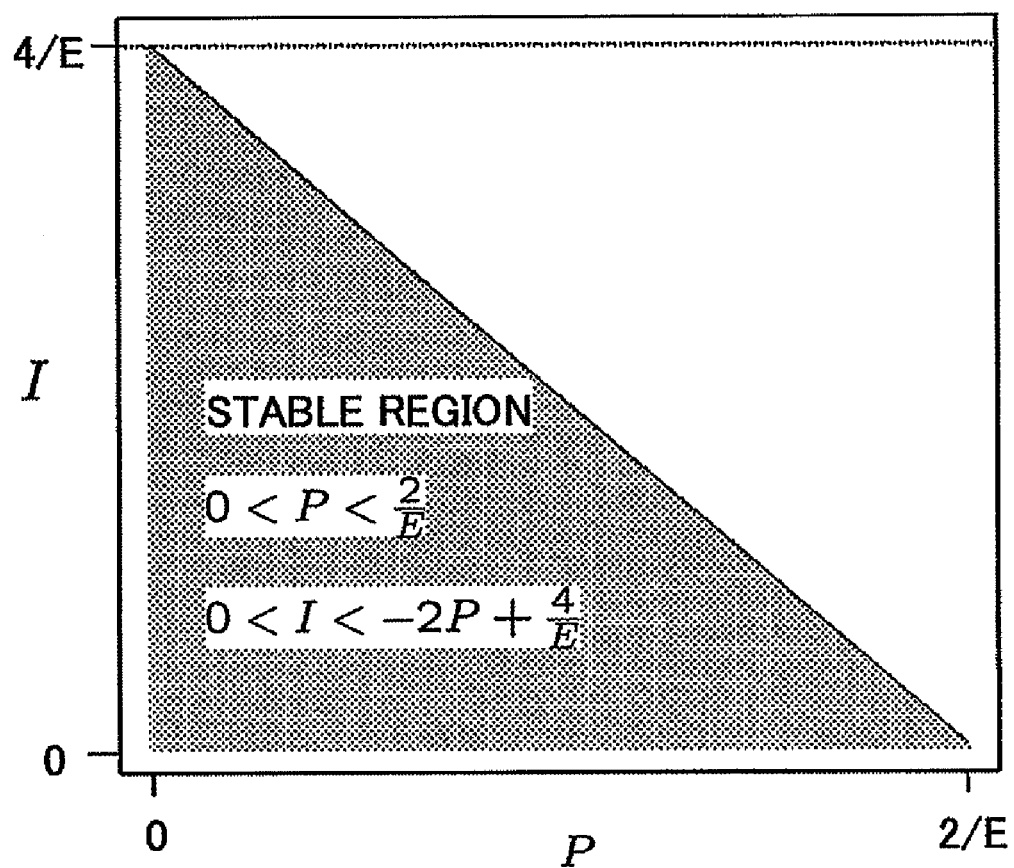
FIG. 9 is a diagram for explaining a stable region of control parameters P and I.
Figure 10:
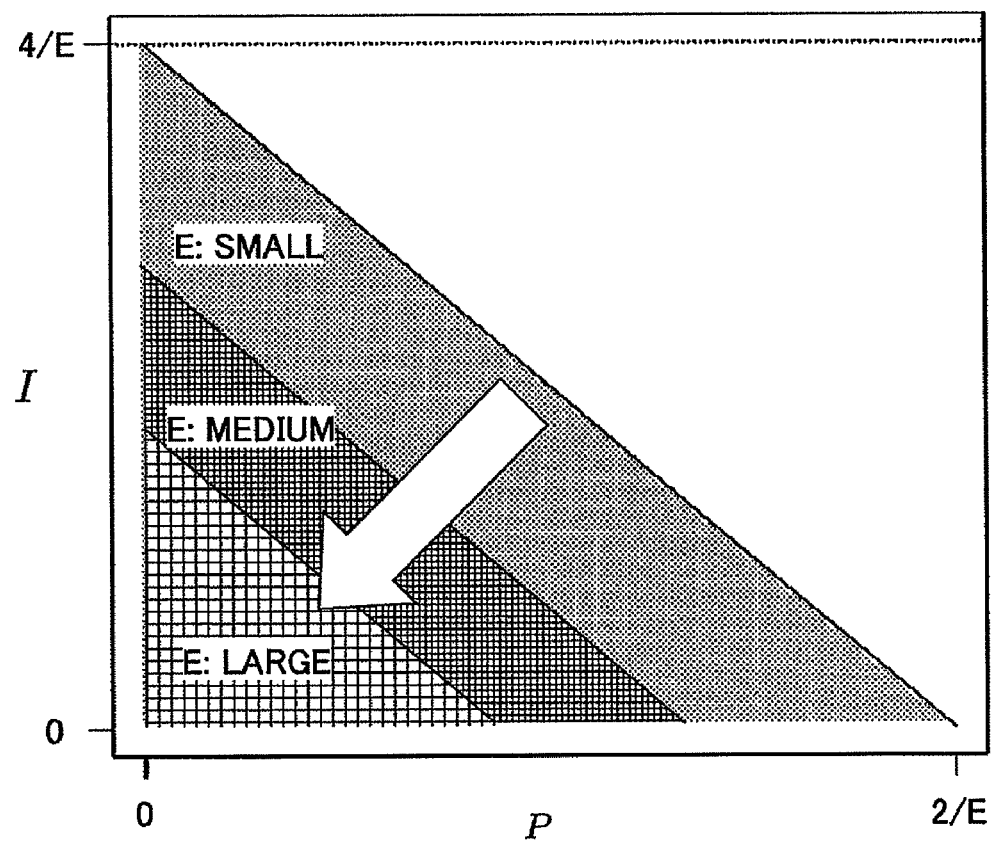
FIG. 10 is a diagram for explaining a change in the stable region of the control parameters P and I.

In this embodiment, the admission probability is controlled using the control parameters P and I that are obtained from within a stable region indicated by the half-tone dot meshing in FIG. 9, based on the relationships (5) and (6). FIG. 9 is a diagram for explaining the stable region of the control parameters P and I. In FIG. 9 and FIG. 10 which will be described later, the ordinate indicates the control parameter I, and the abscissa indicates the control parameter P. The stable region shown in FIG. 9 depends upon $E=\Sigma_i in_i$, that is, the sum of the bandwidth of the new sessions requested at the intervals with which the admission control server 3 acquires the bandwidth information, as shown in FIG. 10. FIG. 10 is a diagram for explaining a change in the stable region of the control parameters P and I. Because the stable region becomes smaller (that is, the control parameters P and I become smaller) as the sum E of the bandwidth becomes larger, the stable region is designed on the safer side by setting the sum E of the bandwidth to a large value.

For example, if the sum E of the bandwidth of the new sessions which may be generated within the bandwidth information measurement interval is 50 Mbps or less, the sum E is set to E=50 Mbps or to E=0.5, for example. The unit of the bandwidth represented on the theoretical model of this embodiment must be unified, E=50 Mbps if the unit of the bandwidth treated on the theoretical model is Mbps, and E=0.5 if the bandwidth treated on the theoretical model is represented as ratios of physical bandwidth.

[PID Controller]

Figure 11:
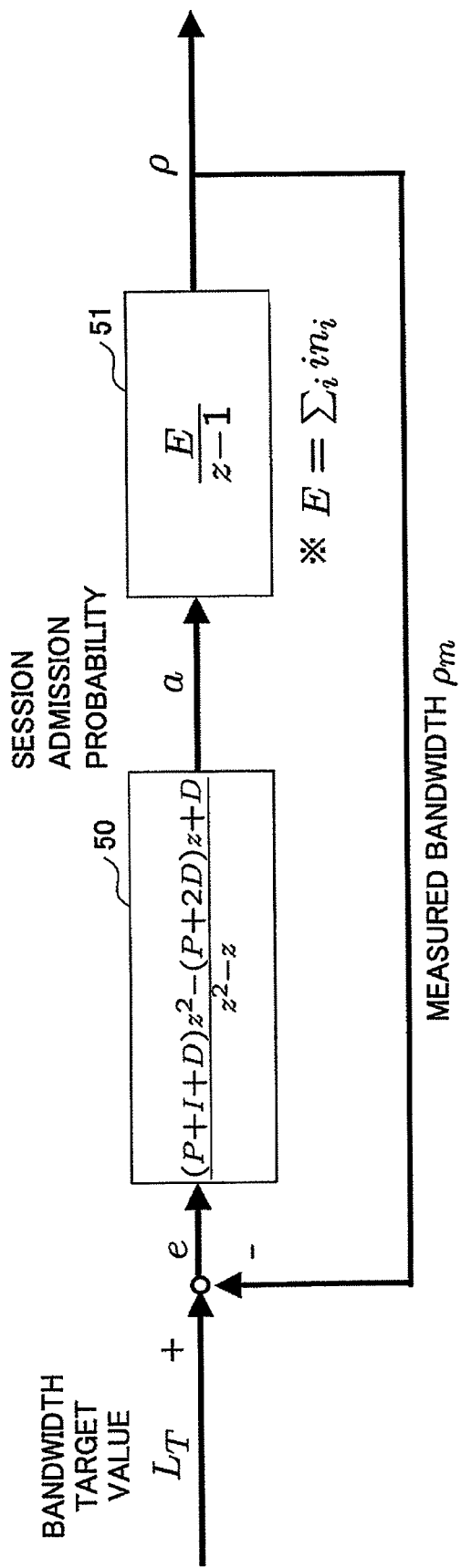
FIG. 11 is a block diagram showing a feedback model for a case where a PID controller is used as the feedback controller.

FIG. 11 is a block diagram showing a feedback model for a case where a PID controller is used as the feedback controller 50. In this case, it is possible to obtain stable control parameters P, I and D, in a manner similar to the case shown in FIG. 8. In FIG. 11, the session admission probability can be represented by the formula (2) described above, and the sum $\rho$ of the bandwidth of the network 51 can be represented by the formula (3) described above. When the PID controller is used, the admission probability is controlled using the control parameters P, I and D that are obtained from within the stable region in a manner similar to the case where the PI controller is used.

[Evaluation]

This embodiment judges whether or not to accept the session with the set session admission probability, with respect to each session request. For this reason, it is possible to converge the sum of the bandwidth of the path to the bandwidth target value, without having to manage the bandwidth of each session.

Figure 12:
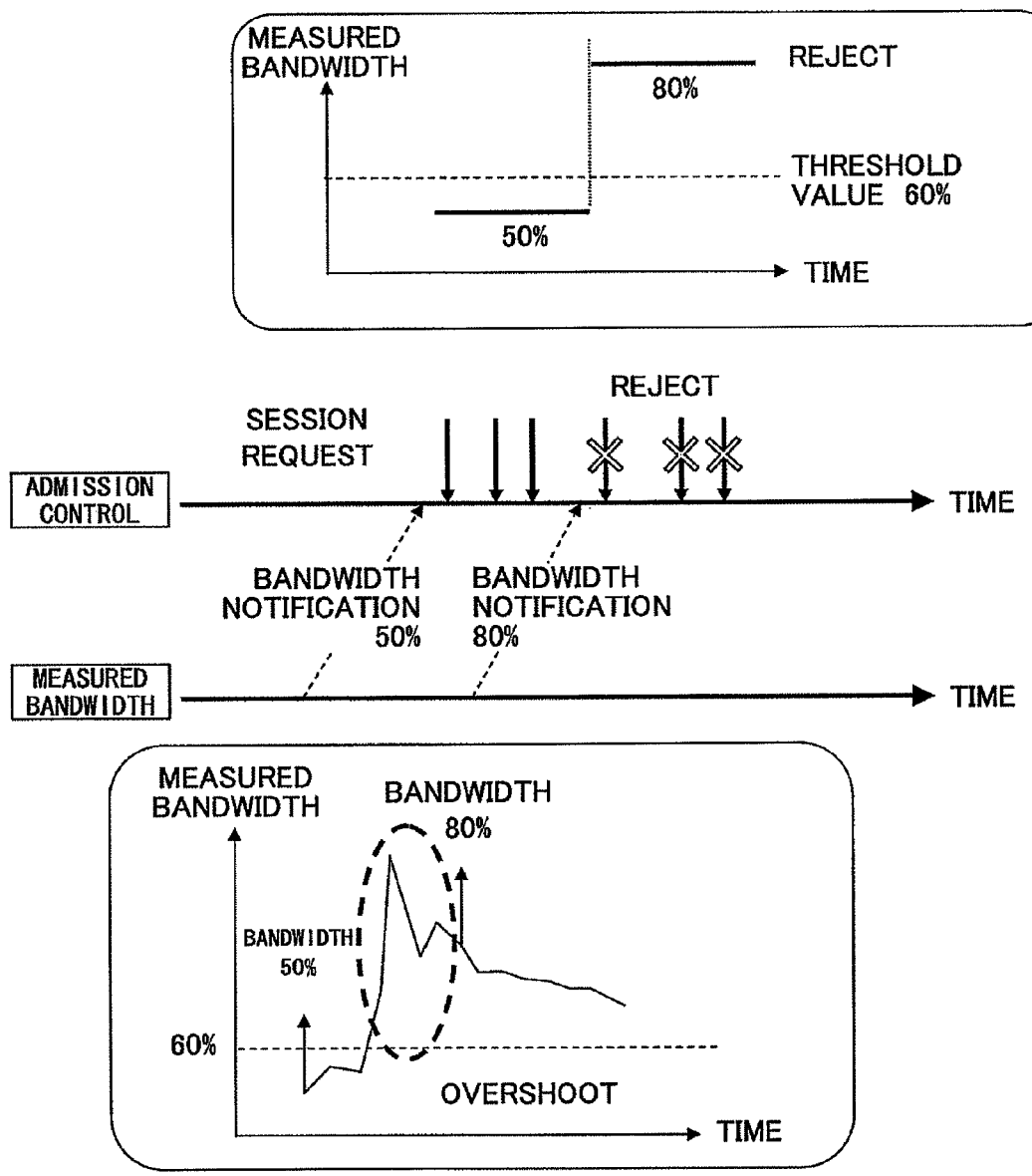
FIG. 12 is a diagram for explaining the conventional bandwidth measurement type admission control method.

FIG. 12 is a diagram for explaining the conventional bandwidth measurement type admission control method which judges whether or not to accept the session depending on whether or not the sum of the bandwidth measured by the measuring apparatus exceeds the bandwidth threshold value. FIG. 12 shows a case where the maximum bandwidth is 100%, the bandwidth threshold value is 60%, and the measured bandwidth changes from 50% to 80%. The traffic is concentrated during the notification interval in which the bandwidth information is notified to the admission control server, and an overshoot is generated such that the sum of the bandwidth exceeds the preset bandwidth threshold value and further exceeds physical bandwidth of the measuring path.

Figure 13:
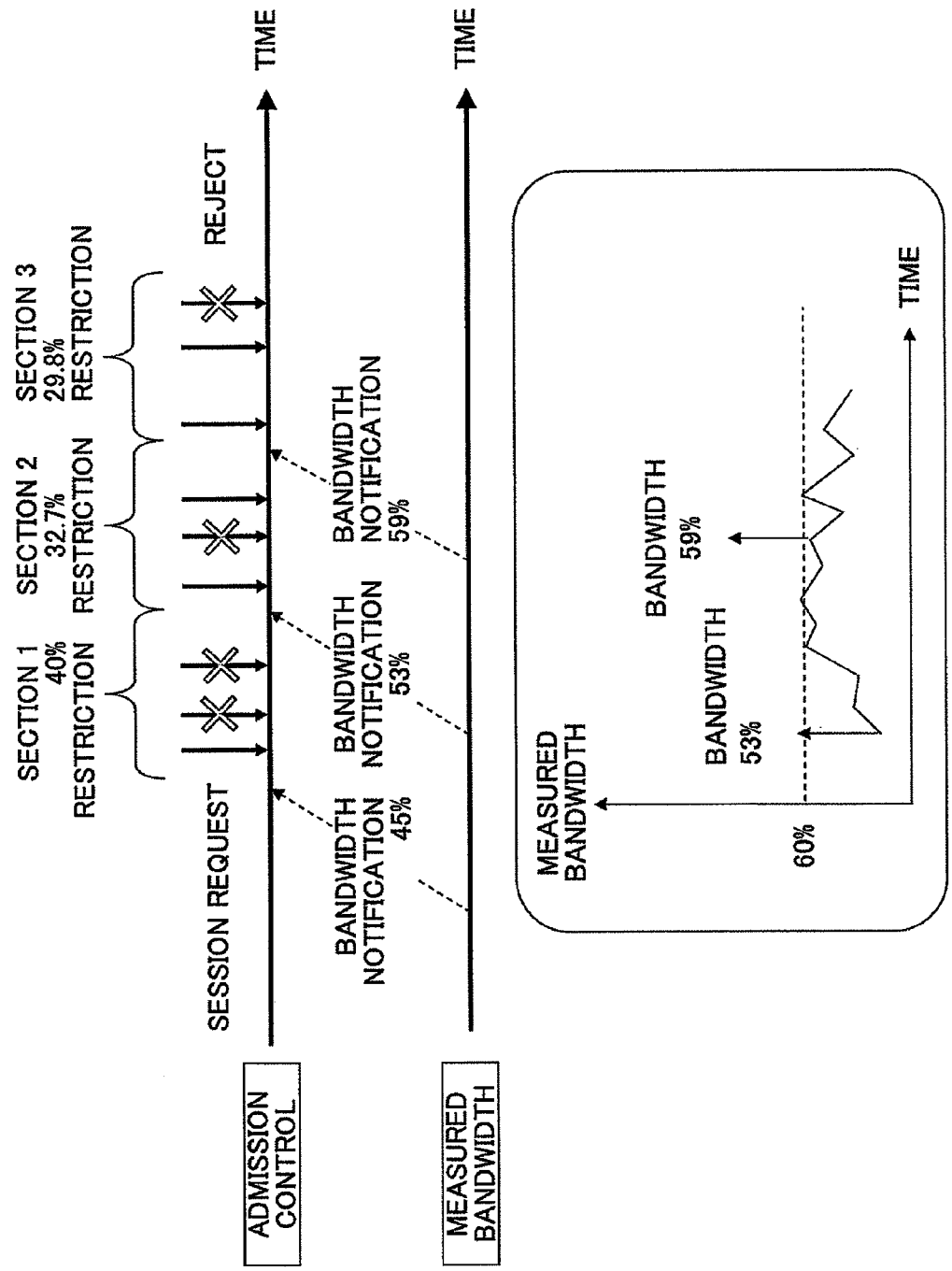
FIG. 13 is a diagram for explaining an embodiment of an admission control method according to the present invention.

FIG. 13 is a diagram for explaining an embodiment of an admission control method according to the present invention. FIG. 13 shows a case where E=1 (=100%), the bandwidth target value is 60%, the bandwidth threshold value at the admission control start is 45%, and the session admission probability a[k] is controlled using the parameters P=1 and I=0.1 that are obtained from within the stable region.

In the section 1 in which the measured bandwidth of 45% (=0.45) is notified, e1=0.6-0.45=0.15 and a1=0.4 (computed value of the previous section). In other words, the session admission probability is restricted to 40%.

In the section 2 in which the measured bandwidth of 53% (=0.53) is notified, e2=0.6-0.53=0.07 and a2=a1+1(e2-e1)+0.1·e2=0.327.

In the section 3 in which the measured bandwidth of 59% (=0.59) is notified, e3=0.6-0.59=0.01 and a3=a2+1(e3-e2)+0.1·e3=0.298.

Figure 14:
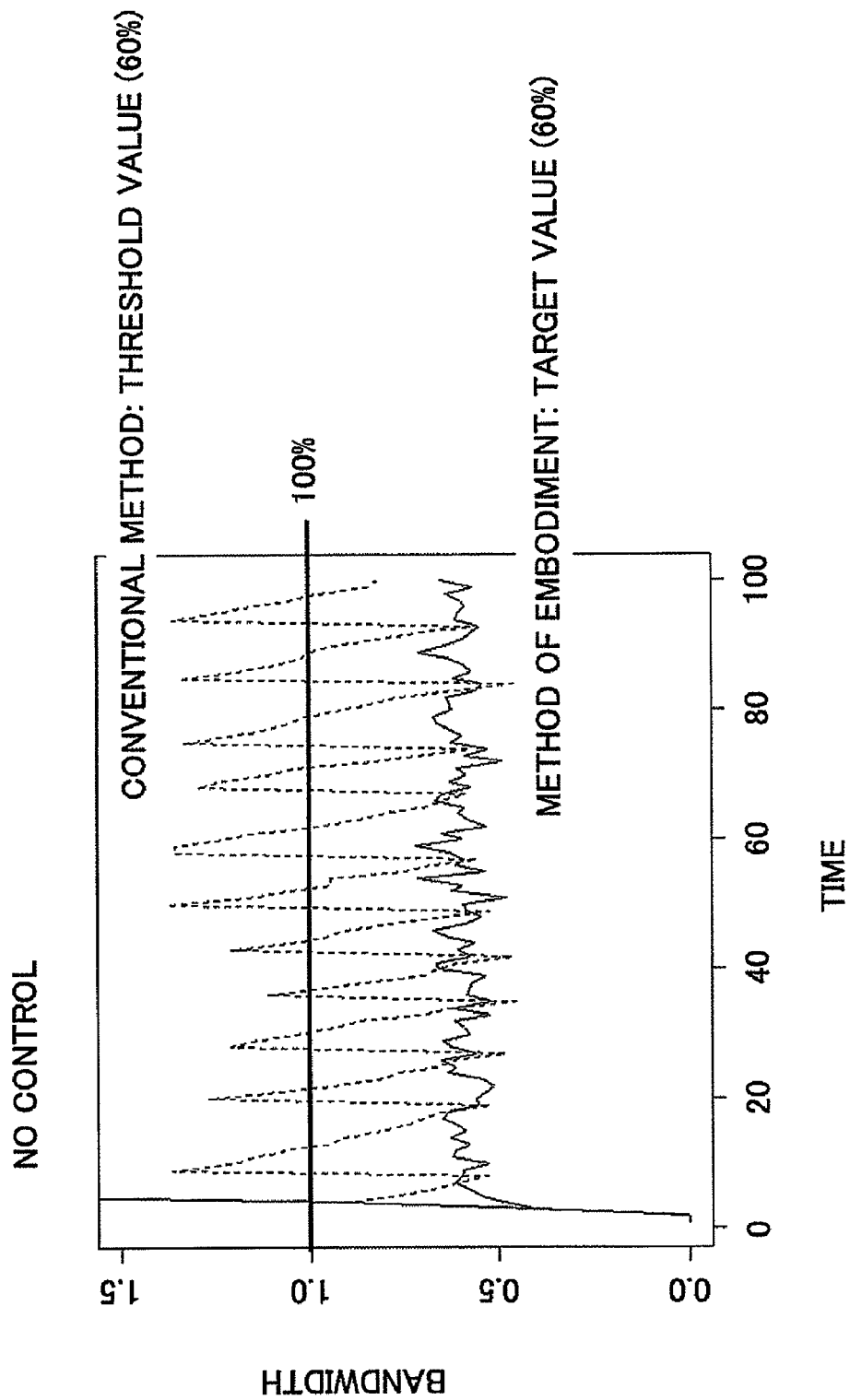
FIG. 14 is a diagram showing simulation evaluation results for the conventional method and the embodiment of the admission control method when session requests having various bandwidth are applied in excess.
Figure 15:
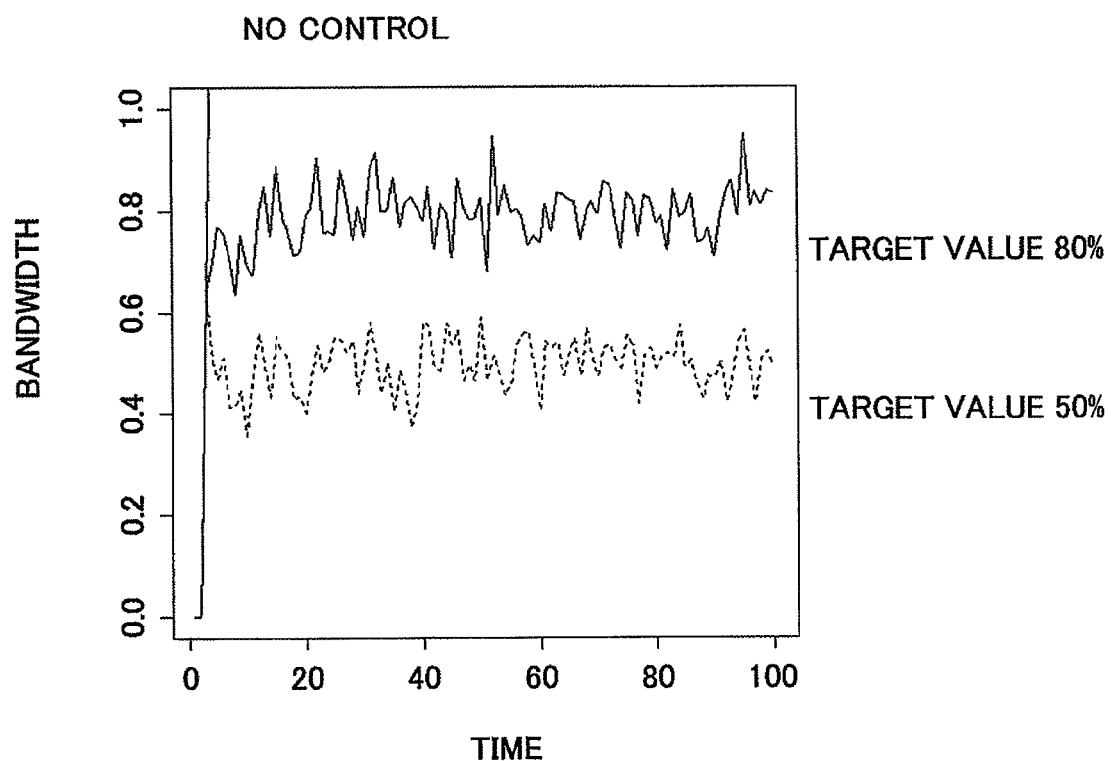
FIG. 15 is a diagram showing simulation evaluation results for the embodiment of the admission control method when bandwidth target values of 50% and 80% are specified.

FIG. 14 is a diagram showing simulation evaluation results for the conventional method shown in FIG. 12 and the embodiment of the admission control method shown in FIG. 13 when session requests having various bandwidth are applied in excess. In FIG. 14 and FIG. 15 which will be described later, the ordinate indicates the bandwidth, and the abscissa indicates the time, where the unit time is the measuring bandwidth measurement interval. Further, in FIG. 14, a dotted line indicates the simulation evaluation results for the conventional method, and a solid line indicates the simulation evaluation results for the embodiment of the admission control method.

According to the conventional method, the overshoot of the bandwidth in the measuring path is generated, and the communication quality is deteriorated because the bandwidth used exceeds 100%, as may be seen from FIG. 14. On the other hand, according to the embodiment of the admission control method, the overshoot of the bandwidth in the measuring path is suppressed, the bandwidth used follows the specified bandwidth target value, and for this reason, no deterioration of the communication quality is generated, as may be seen from FIG. 14.

FIG. 15 is a diagram showing simulation evaluation results for the embodiment of the admission control method when bandwidth target values of 50% and 80% are specified. In FIG. 15, a dotted line indicates the simulation evaluation results for the bandwidth target value of 50%, and a solid line indicates the simulation evaluation results for the bandwidth target value of 80%.

In FIG. 15, even when the bandwidth target value is changed, it is possible to converge the bandwidth to a vicinity of the specified target value while suppressing the overshoot of the bandwidth in the measuring path. Hence, it may be seen that a specified traffic usage can be realized without deteriorating the communication quality of each session (that is, without causing the bandwidth used to exceed 100%). As a result, it is possible to specify the traffic usage by switching the operation policy of the operator (bandwidth target value) depending on the state of use of the services.

Figure 16B:
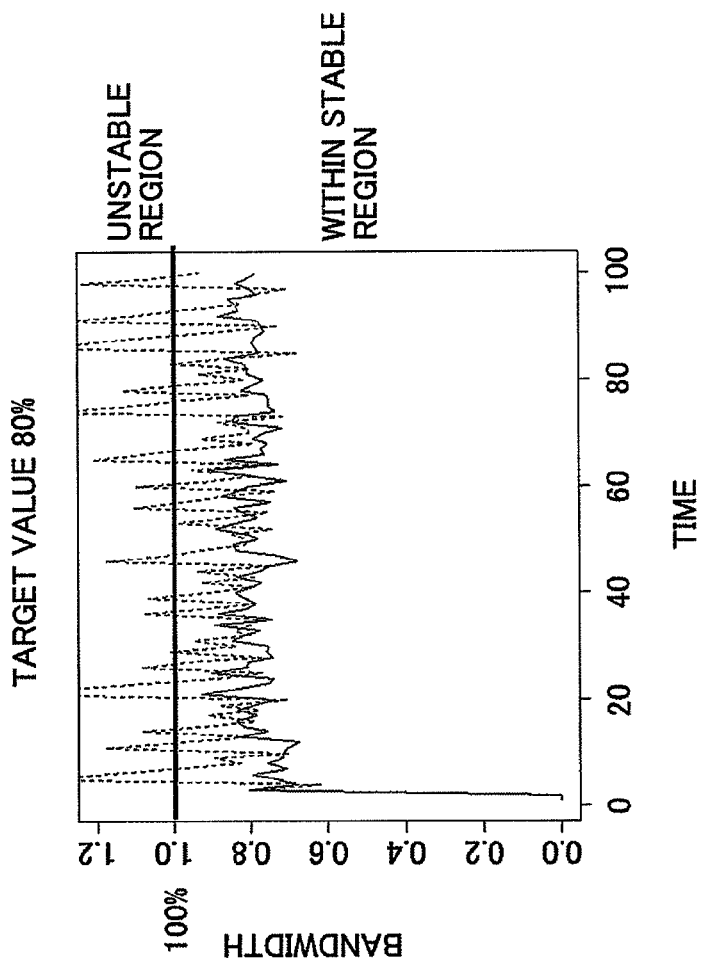
FIGS. 16A and 16B are diagrams for explaining evaluation results using parameters within the stable region and parameters outside the stable region.
Figure 16A:
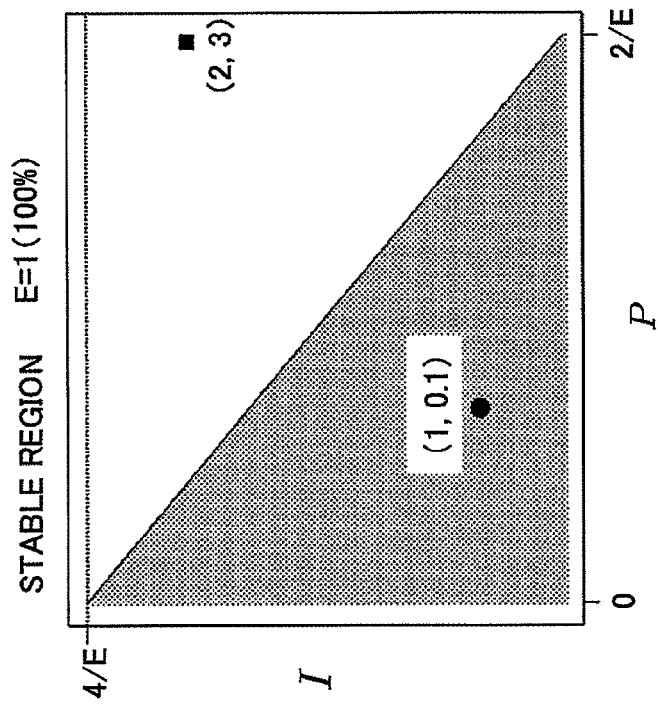

FIGS. 16A and 16B are diagrams for explaining evaluation results using parameters within the stable region obtained from the feedback model and parameters outside the stable region, for the control parameters P and I in the PI controller. In FIG. 16A, the ordinate indicates the control parameter I, and the abscissa indicates the control parameter P. In FIG. 16B, the ordinate indicates the bandwidth, and the abscissa indicates the time, where the unit time is the measuring bandwidth interval.

In this particular case, E=1 (=100%), the bandwidth target value is 80%, and the control parameter P=1 and the control parameter I=0.1 are selected as the stable control parameters, as shown in FIG. 16A. As indicated by a solid line in FIG. 16B, it is possible to converge the bandwidth to a vicinity of the target value of 80%.

However, if unstable control parameters P=2 and I=3 are used, an overshoot of the bandwidth in the measuring path is generated as indicated by a dotted line in FIG. 16B. In this case, the bandwidth used exceeds 100%, and the communication quality deteriorates. Accordingly, in the embodiment, the stable control parameters are obtained in advance from the feedback model shown in FIG. 8, before controlling the session admission probability.

Figure 17:
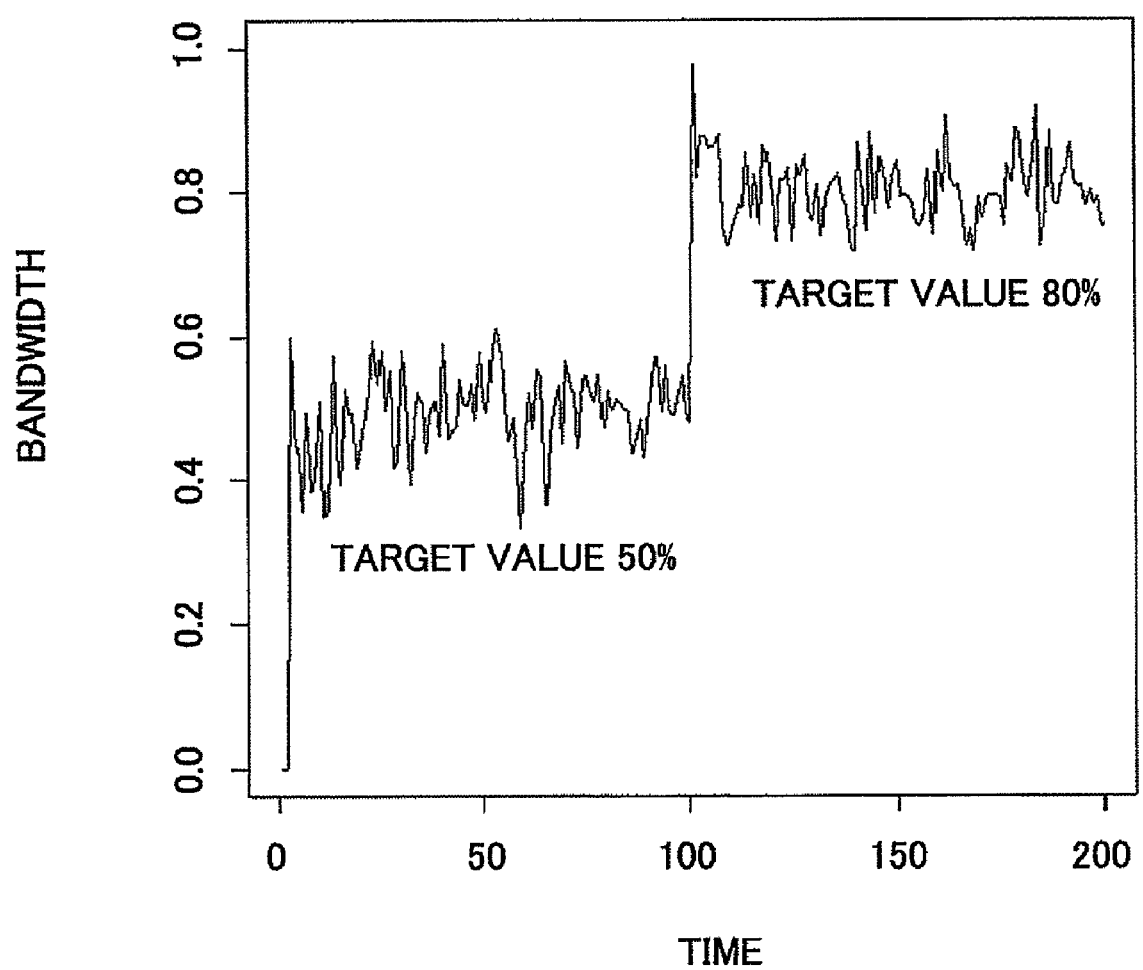
FIG. 17 is a diagram showing evaluation results for a case where the bandwidth target value of the admission control is switched during execution of the admission control.

FIG. 17 is a diagram showing evaluation results for a case where the bandwidth target value in the admission control is switched during execution of the admission control. In FIG. 17, the ordinate indicates the bandwidth, and the abscissa indicates the time, where the unit time is the measuring bandwidth interval. In this particular case, the bandwidth target value is switched from 50% to 80%. However, it may be seen from FIG. 17 that the bandwidth is converged to a vicinity of the specified bandwidth target value while suppressing the overshoot of the bandwidth in the measuring path, and that the traffic usage is switched dynamically.

[Setting Measuring Bandwidth Notification Timing]

Figure 18:
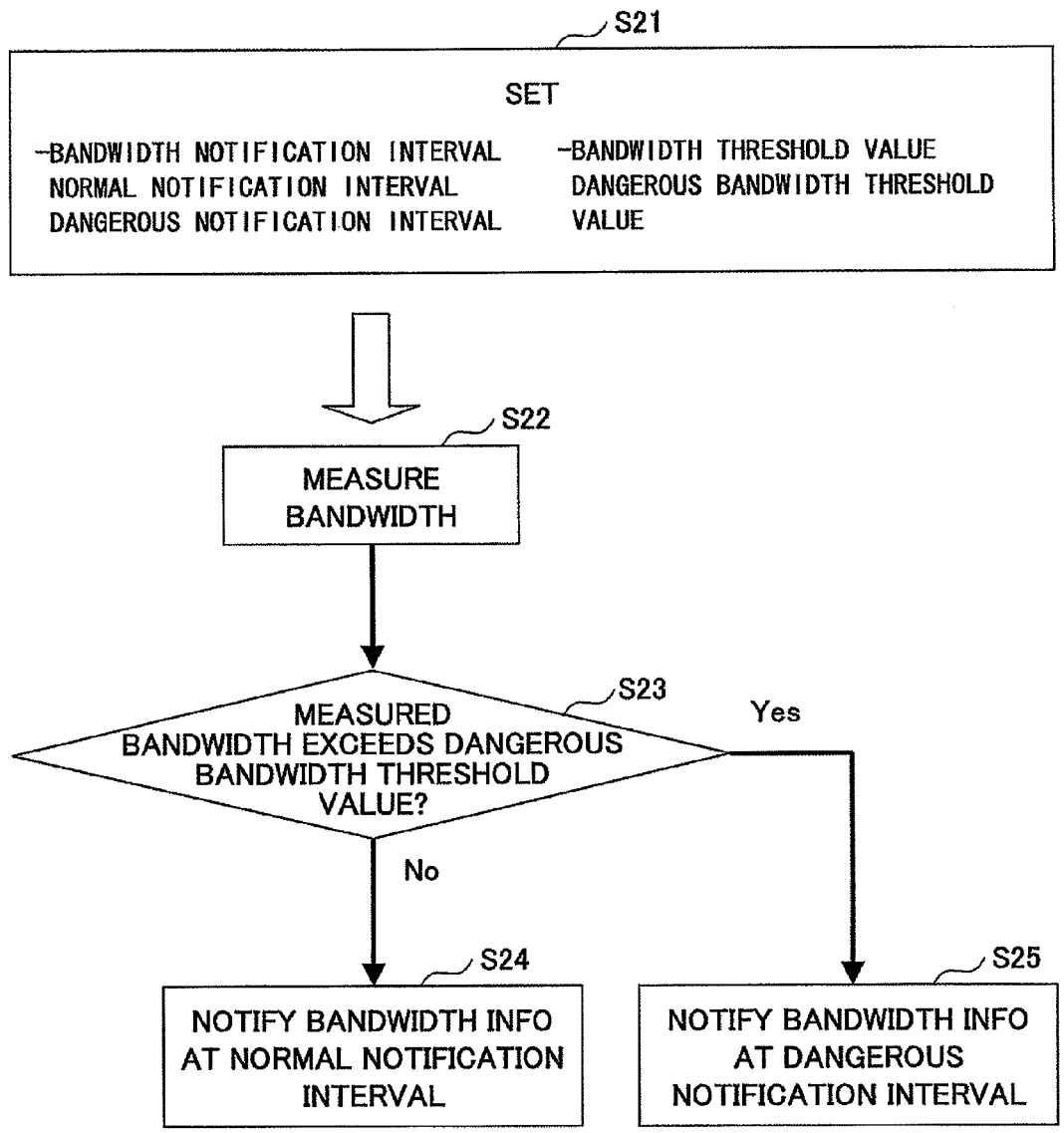
FIG. 18 is a flow chart for explaining a process of the bandwidth measuring apparatus.

FIG. 18 is a flow chart for explaining a process of the bandwidth measuring apparatus 1. In a step S21 shown in FIG. 18, a dangerous bandwidth threshold value (for example, 80%) is set to the bandwidth measuring apparatus 1, and the bandwidth information notification interval is separately set for the normal notification interval (for example, 5 minutes) and the dangerous notification interval (for example, 1 minute).

In a step S22, the bandwidth measuring apparatus 1 measures the bandwidth. In a step S23, the bandwidth measuring apparatus 1 judges whether or not the measured bandwidth exceeds the dangerous bandwidth threshold value. In a normal state where the measured bandwidth is less than or equal to the dangerous bandwidth threshold value, the bandwidth measuring apparatus 1 notifies the measured bandwidth to the admission control server 3 at normal notification intervals in a step S24. On the other hand, if the measured bandwidth exceeds the dangerous bandwidth threshold value, the bandwidth measuring apparatus 1 notifies the measured bandwidth to the admission control server 3 at dangerous notification intervals in a step S25.

FIG. 19 is a diagram showing state of a bandwidth notification from the bandwidth measuring apparatus 1 to the admission control server 3 when the measured bandwidth which was less than the dangerous bandwidth threshold value exceeds the dangerous bandwidth threshold value.

By providing the mechanism described above, it is possible to update the session admission probability at narrower intervals when the traffic concentrates, so that it is possible to realize an admission control having a high convergence accuracy.

Therefore, when a sharp bandwidth change occurs within the bandwidth information notification interval, it is possible to adjust the update timing of the session admission probability at the bandwidth measuring apparatus 1. Consequently, it is possible to suppress the overshoot of the bandwidth in the measuring path with a high precision, and to improve the manner in which the bandwidth used follows the specified target value.

In the embodiment, the bandwidth measuring apparatus 1 may be formed by a suitable bandwidth measuring schemes. The admission control server 3 may be formed by a suitable admission control schemes. In addition, the session management server 4 may be formed by a suitable session management schemes.

This application claims the benefit of a Japanese Patent Application No. 2007-044544 filed Feb. 23, 2007, in the Japanese Patent Office, the disclosure of which is hereby incorporated by reference.

Further, the present invention is not limited to these embodiments, but various variations and modifications may be made without departing from the scope of the present invention.

What is claimed is:

1. An admission control method for determining a session admission probability with respect to a new session admission of a path, so that a bandwidth measured by a bandwidth measuring apparatus in the path and corresponding to a sum of bandwidths used converges to a vicinity of a bandwidth target value, comprising:
    computing, in an admission control server, the session admission probability based on a deviation between the measured bandwidth and the bandwidth target value using a feedback control rule of a closed loop system; and
    judging, in a session management server, whether to accept a new session in the path based on the computed session admission probability, and processing the new session admission based on a result of the judging,
    wherein parameters of the feedback control rule have values that are obtained from within a stable region of the parameters, the stable region is based on a sum of bandwidths requested by new sessions to the path at measuring intervals of the measured bandwidth, and the stable region becomes smaller as the sum of the bandwidths requested by the new sessions to the path becomes larger.

2. The admission control method as claimed in claim 1, further comprising:
    judging, by the session management server, whether to accept the new session in the path based on the computed session admission probability when the measured bandwidth exceeds a bandwidth threshold value of an admission control start which is preset, and processes the new session admission based on the result of said judging whether or not to accept the new session.

3. The admission control method as claimed in claim 1, further comprising:
    setting, by the bandwidth measuring apparatus, a notification interval of the measured bandwidth when the measured bandwidth exceeds a dangerous bandwidth threshold value which is preset, to a value smaller than a notification interval of the measured bandwidth when the measured bandwidth is less than or equal to the dangerous bandwidth threshold value.

4. An admission control system for determining a session admission probability with respect to a new session admission of a path, so that a bandwidth measured in the path and corresponding to a sum of bandwidths used converges to a vicinity of a specified target value, comprising:
    a bandwidth measuring apparatus configured to measure the sum of the bandwidths used in the path as a measured bandwidth;
    an admission control server configured to compute the session admission probability based on a deviation between the measured bandwidth notified from the bandwidth measuring apparatus and the bandwidth target value using a feedback control rule of a closed loop system; and
    a session management server configured to judge whether or not to accept a new session in the path based on the session admission probability computed by the admission control server, and to process the new session admission based on a result of a judgement made by the session management server,
    wherein parameters of the feedback control rule used by the admission control server have values that are obtained from within a stable region of the parameters, the stable region is based on a sum of bandwidths requested by new sessions to the path at measuring intervals of the measured bandwidth, and the stable region becomes smaller as the sum of the bandwidths requested by the new sessions to the path becomes larger.

5. The admission control system as claimed in claim 4, wherein the session management server judges whether to accept the new session in the path based on the computed session admission probability when the measured bandwidth exceeds a bandwidth threshold value of an admission control start which is preset, and processes the new session admission based on the result of the judgement.

6. The admission control system as claimed in claim 4, wherein the bandwidth measuring apparatus sets a notification interval of the measured bandwidth when the measured bandwidth exceeds a dangerous bandwidth threshold value which is preset, to a value smaller than a notification interval of the measured bandwidth when the measured bandwidth is less than or equal to the dangerous bandwidth threshold value.

7. The admission control system as claimed in claim 4, wherein the feedback control rule used by the admission control server is a PI control rule.

8. The admission control system as claimed in claim 4, wherein the feedback control rule used by the admission control server is a PID control rule.

9. The admission control system as claimed in claim 4, further comprising:
    means for setting the bandwidth target value and the bandwidth threshold value of the admission control start to the admission control server.

* * * * *